(12) United States Patent
Kurita

(10) Patent No.: US 11,645,420 B2
(45) Date of Patent: May 9, 2023

(54) NON-TRANSITORY COMPUTER-READABLE STORAGE MEDIUM AND COMMUNICATION DEVICE

(71) Applicant: FUJITSU LIMITED, Kawasaki (JP)

(72) Inventor: Toshihiko Kurita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 17/373,823

(22) Filed: Jul. 13, 2021

(65) Prior Publication Data

US 2022/0067201 A1    Mar. 3, 2022

(30) Foreign Application Priority Data

Aug. 27, 2020 (JP) ............................. JP2020-143265

(51) Int. Cl.

| | |
|---|---|
| *G06F 21/62* | (2013.01) |
| *H04L 9/06* | (2006.01) |
| *H04L 9/40* | (2022.01) |
| *G06Q 30/00* | (2023.01) |
| *G06Q 50/26* | (2012.01) |

(Continued)

(52) U.S. Cl.
CPC ........ *G06F 21/6254* (2013.01); *H04L 9/0643* (2013.01); *H04L 63/0414* (2013.01); *H04L 63/18* (2013.01); *G06Q 30/0185* (2013.01); *G06Q 50/265* (2013.01); *H04L 2209/08* (2013.01)

(58) Field of Classification Search
CPC ............. G06F 21/6254; G06F 21/6245; H04L 9/0643; H04L 63/0414; H04L 63/18; H04L 2209/08; H04L 9/3268; H04L 63/0823; H04L 63/12; G06Q 30/0185; G06Q 50/265

See application file for complete search history.

(56) References Cited

U.S. PATENT DOCUMENTS 10,204,236 B1 *  2/2019  Tang ................... G06F 12/0862
10,862,883 B1 * 12/2020  Bhattacharyya .... H04L 63/0807
(Continued)

FOREIGN PATENT DOCUMENTS

| CN | 103220673 B | * | 3/2016 |
|---|---|---|---|
| CN | 107423977 |   | 12/2017 |

(Continued)

OTHER PUBLICATIONS

Extended European Search Report (EESR) of corresponding European Patent Application No. 21183881.8 dated Jan. 4, 2022, 8 pages.

*Primary Examiner* — Darren B Schwartz
(74) *Attorney, Agent, or Firm* — Fujitsu Patent Center

(57) ABSTRACT

A non-transitory computer-readable storage medium storing a program that causes a processor included in a business operator's terminal to execute a process, the process includes conversion processing and confirmation request processing. The conversion processing that converts user information acquired from an user into a management format and obtains converted user information. The confirmation request processing that calculates a first hash value obtained by hashing the converted user information with a first hash function, transmits a confirmation request including the first hash value, the first hash function, and conversion content of the conversion to the user, and requests the user to confirm validity of the user information managed.

10 Claims, 12 Drawing Sheets

(51) Int. Cl.
*H04L 9/32* (2006.01)
*G06Q 30/018* (2023.01)

(56) References Cited

U.S. PATENT DOCUMENTS

| | | | |
|---|---|---|---|
| 11,516,201 B2* | 11/2022 | Wu | H04L 9/3213 |
| 2002/0116382 A1* | 8/2002 | Koyama | H04L 63/0442 |
| | | | 707/999.009 |
| 2008/0092216 A1* | 4/2008 | Kawano | G06F 21/46 |
| | | | 726/5 |
| 2008/0181403 A1* | 7/2008 | Sakamoto | H04L 9/3236 |
| | | | 708/250 |
| 2010/0017850 A1* | 1/2010 | More | H04L 63/12 |
| | | | 726/2 |
| 2010/0251341 A1 | 9/2010 | Kijima | |
| 2014/0047551 A1 | 2/2014 | Nagasundaram et al. | |
| 2014/0325592 A1 | 10/2014 | Unagami et al. | |
| 2016/0092699 A1* | 3/2016 | Riva | H04L 63/0421 |
| | | | 726/26 |
| 2019/0052467 A1* | 2/2019 | Bettger | H04L 9/088 |
| 2019/0251290 A1 | 8/2019 | Maier et al. | |

FOREIGN PATENT DOCUMENTS

| | | | |
|---|---|---|---|
| CN | 104158827 B | * | 7/2018 |
| JP | 2012-014424 | | 1/2012 |
| JP | 2019-046036 A | | 3/2019 |
| JP | 2019-144723 A | | 8/2019 |
| JP | 2020-047308 A | | 3/2020 |

* cited by examiner

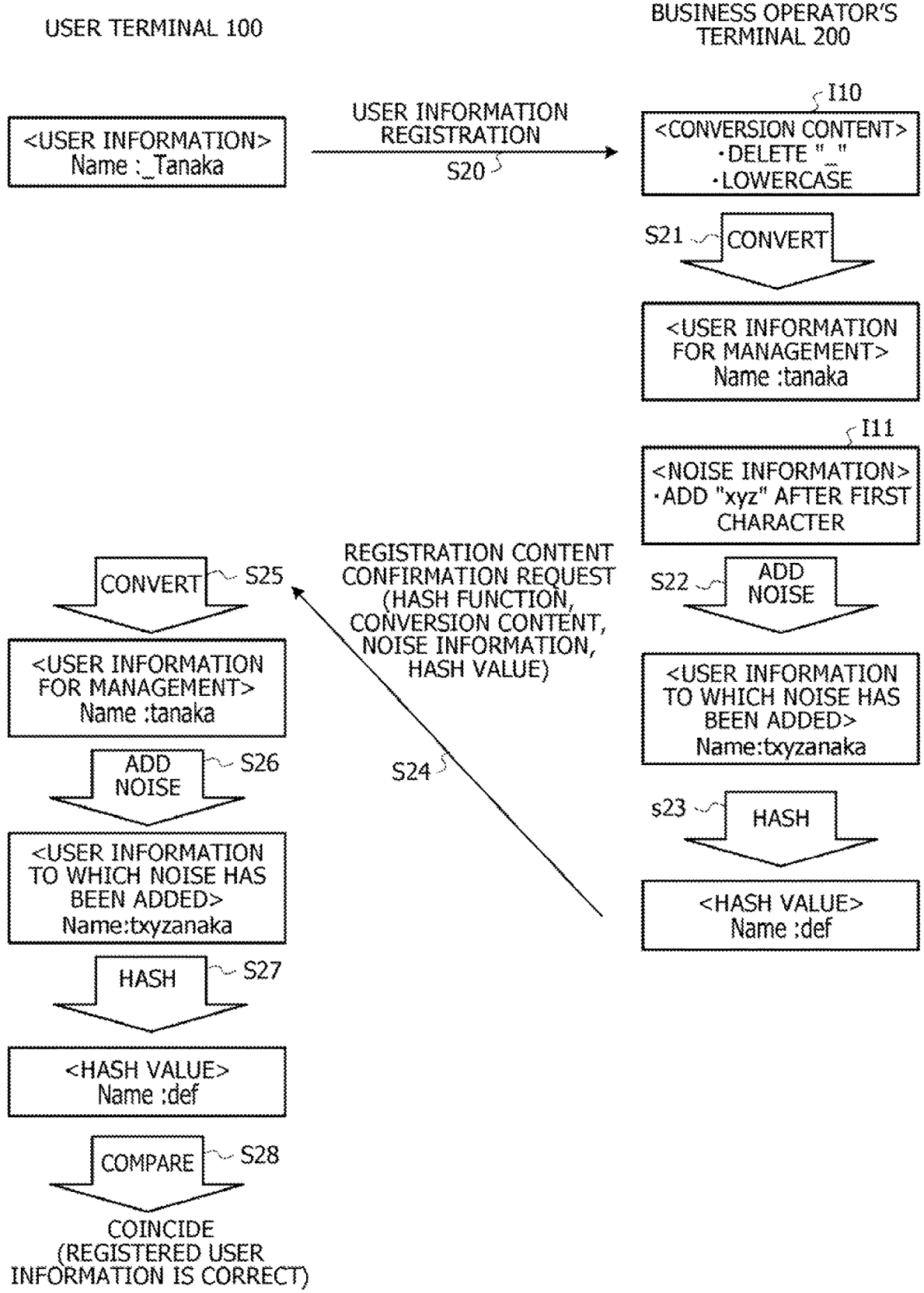

FIG. 11

(1) DELETION OF BLANKS AT BEGINNING AND END
(2) DELETION OF CONSECUTIVE BLANKS
(3) CONVERSION OF UPPERCASE/LOWERCASE
(4) CONVERSION OF FULL-WIDTH/HALF-WIDTH
(5) CONVERSION OF HIRAGANA/KATAKANA
(6) CONVERSION INTO DATE FORMAT (yyyy/mm/dd)
(7) CONVERSION INTO PHONE NUMBER FORMAT (000-000-0000)

| ATTRIBUTE NAME | CONVERSION CONTENT | |
|---|---|---|
| Name | (1)+(2)+(3) (LOWERCASE) | Tanaka → tanaka |
| Birthdate | (1)+(2)+(6) | 2001/1/1 → 2001/01/01 |
| Address | (1)+(2)+(3) (LOWERCASE) | 4-1-1,Kamikodanaka,Nakahara-ku,Kawasaki → 4-1-1,kamikodanaka,nakahara-ku,kawasaki |
| Telephone | (1)+(2)+(7) | 044 754 2847 → 044-754-2847 |
| Occupation | (1)+(2)+(3) (LOWERCASE) | Engineer → engineer |
| Email | (1)+(2)+(3) (LOWERCASE) | Taro@sample.com → taro@sample.com |

FIG. 12

| METHOD NAME | EXPLANATION | APPLICATION EXAMPLE |
|---|---|---|
| TOKENIZATION | ADD CHARACTER STRING TO SPECIFIC POSITION | ADD xyz AFTER FIRST CHARACTER: "tanaka"→"txyzanaka" |
| MASKING | REPLACE SPECIFIC POSITION WITH SPECIFIC CHARACTER | REPLACE FIRST AND SECOND CHARACTERS WITH "*": "tanaka"→"**naka" |
| EXCHANGE | EXCHANGE CHARACTERS AT SPECIFIC POSITIONS | EXCHANGE FIRST AND SECOND CHARACTERS "tanaka"→"atnaka" |

NON-TRANSITORY COMPUTER-READABLE STORAGE MEDIUM AND COMMUNICATION DEVICE

CROSS-REFERENCE TO RELATED APPLICATION

This application is based upon and claims the benefit of priority of the prior Japanese Patent Application No. 2020-143265, filed on Aug. 27, 2020, the entire contents of which are incorporated herein by reference.

FIELD

The embodiments discussed herein are related to a non-transitory computer-readable storage medium, a communication device, a communication method, and a communication system.

BACKGROUND

A distributed ID distribution platform that safely distributes decentralized identity information (hereinafter, may be referred to as ID information) as a digital certificate with agreement with the identical person has attracted more attention. From viewpoint of security and personal information protection, regarding the ID distribution platform, it is desirable not to distribute the ID information of the user (user information) in a format that can be read by a third party.

Regarding the ID distribution platform, there is a case where the user confirms whether or not the user information of the user himself/herself is correctly registered by a business operator. At this time, the business operator anonymizes and distributes the user information. For example, the business operator hashes the user information managed by the business operator himself/herself using a hash function and transfers the calculated hash value and the hash function to the user. The user hashes the user information of the user himself/herself using the hash function, compares the received hash value with the calculated hash value, and confirms whether or not the managed user information is correct.

Techniques related to anonymization such as a digital certificate are described in the following prior art documents.

Examples of the related art include Japanese Laid-open Patent Publication No. 2020-47308, Japanese Laid-open Patent Publication. No. 2019-141723, Japanese Laid-open Patent Publication No. 2019-46036, U.S. Laid-open Patent Publication No. 2014-0047551, and U.S. Laid-open Patent Publication No. 2019-0251290.

SUMMARY

According to an aspect of the embodiments, a non-transitory computer-readable storage medium storing a program that causes a processor included in a business operator's terminal to execute a process, the process includes conversion processing that converts user information acquired from an user into a management format and obtains converted user information; and confirmation request processing that calculates a first hash value obtained by hashing the converted user information with a first hash function, transmits a confirmation request including the first hash value, the first hash function, and conversion content of the conversion to the user, and requests the user to confirm validity of the user information managed.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating an example of user information registration confirmation processing according to a second embodiment;

FIG. 11 is a diagram illustrating an example of format conversion; and

FIG. 12 is a diagram illustrating an example of noise information.

DESCRIPTION OF EMBODIMENTS

In the related art, when the user information is registered to the business operator, there is a case where the user registers the user information in a format different from a format requested by the business operator, for example, notational fluctuation, insertion of extra characters and blanks, a format error, or the like. In this case, the business operator converts the user information into a format unique to the business operator and registers and manages the user information. Since a hash value of the user information of which the format has been converted is different from a hash value of the user information before the format is converted, although correct user information in a different format is actually managed, there is a case where the user determines that correct information is not managed.

Therefore, one disclosure provides a communication program, a communication device, a communication method, and a communication system that suppress wrong determination by a user in collation of user information using a hash value.

First Embodiment

A first embodiment will be described.

<Exemplary Configuration of Communication System 1>

Figure 1:
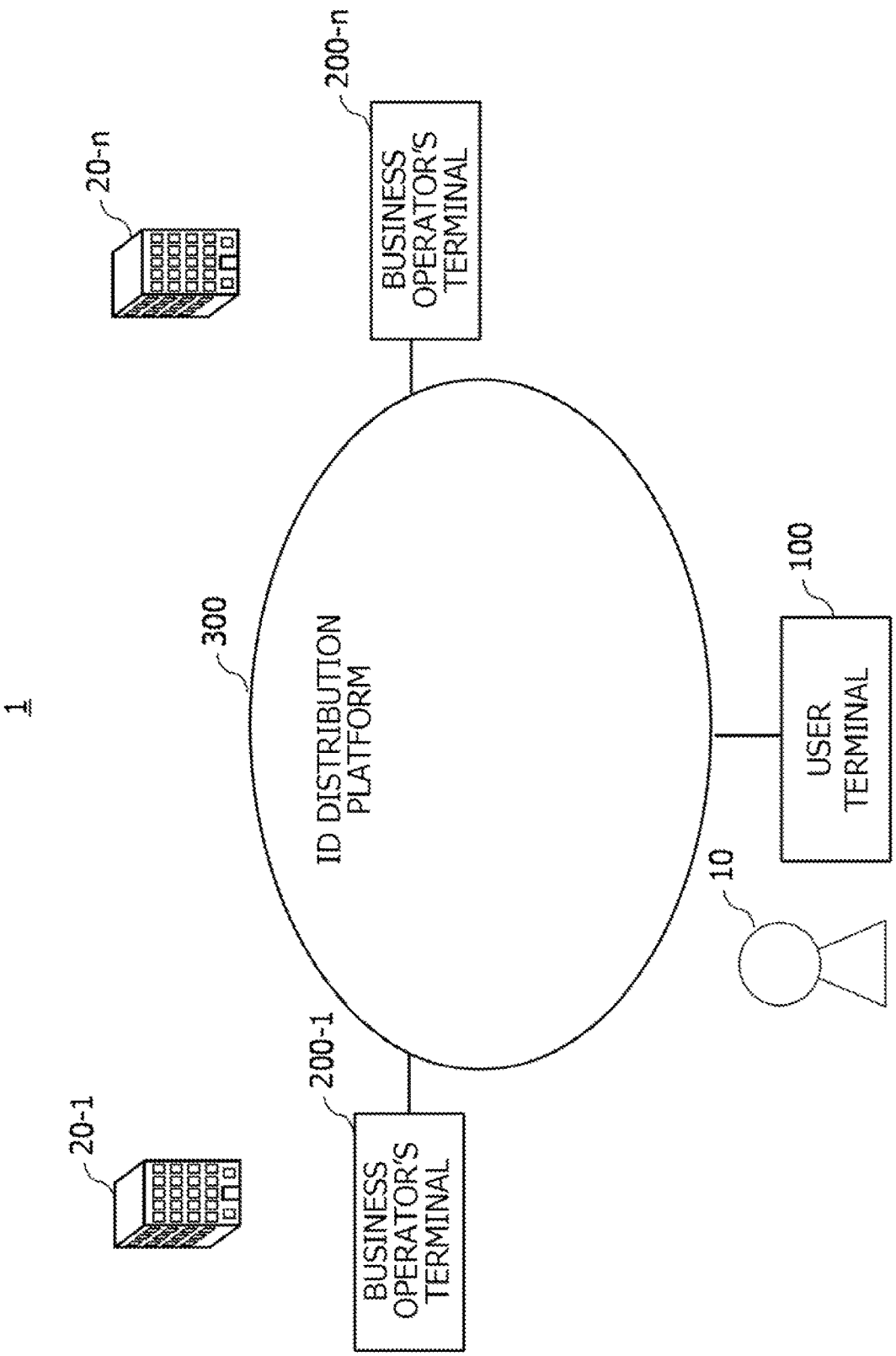
FIG. 1 is a diagram illustrating an exemplary configuration of a communication system 1.

FIG. 1 is a diagram illustrating an exemplary configuration of a communication system 1. The communication system 1 includes a user 10, a user terminal 100, business operators 20-1 to 20-n (n is integer), business operator's terminals 200-1 to 200-n, and an ID distribution platform 300. The communication system 1 is a system that registers user information including personal information such as an attribute of the user 10 to the business operators 20-1 to 20-n and uses the registered user information as a digital certificate. The user information is, for example, attribute information regarding an attribute such as the gender or an address of the user 10.

The user 10 is, for example, an individual user who requests for registration of a digital certificate or issuance of a digital certificate or a user who uses a service. The user 10 uses the user terminal 100 and registers the user information to the business operators 20-1 to 20-n.

The user terminal 100 is a communication device used by the user 10 and is, for example, a smartphone, a tablet terminal, a computer, or a server machine. The user terminal 100 registers the user information of the user 10 in the business operator's terminals 200-1 to 200-n. The user terminal 100 communicates with the business operator's terminals 200-1 to 200-n via the ID distribution platform 300. Furthermore, the user terminal 100 can communicate with the business operator's terminals 200-1 to 200-n without via the ID distribution platform 300.

The business operators 20-1 to 20-n (hereinafter, may be referred to as business operator 20) are persons who issue certificates to the user 10 and are, for example, companies or public institutions. The public institution includes, for example, public institutions such as government offices, driver's license headquarters or educational institutions such as schools. Furthermore, the business operator 20 is a person who requests the user 10 to proof identity, and is, for example, a service provider or a service providing company that provides a service.

The business operator's terminals 200-1 to 200-n (hereinafter, may be referred to as business operator's terminal 200) are communication devices used by the business operator 20 and are, for example, computers or server machines. A business operator's terminal 200-x (x is integer) is used by a business operator 20-x. The business operator's terminal 200 executes processing regarding the user information and the digital certificate such as registration or confirmation request of the user information. The business operator's terminal 200 communicates with the user terminal 100 and the other business operator's terminal 200 via the ID distribution platform 300 Furthermore, the business operator's terminal 200 can communicate with the user terminal 100 without via the ID distribution platform 300.

The ID distribution platform 300 is a communication network (second network) that transmits or receives digital certificates, confirms registration of the user information to the user 10, or the like. Because the ID distribution platform 300 distributes personal information (user information) such as a digital certificate, the ID distribution platform 300 desirably has higher security (confidentiality) than a normal network (first network). Therefore, the ID distribution platform 300 maintains high security, or example, by transmitting. or receiving a hash value or the like, <Exemplary Configuration of Business Operator's Terminal 200>

Figure 2:
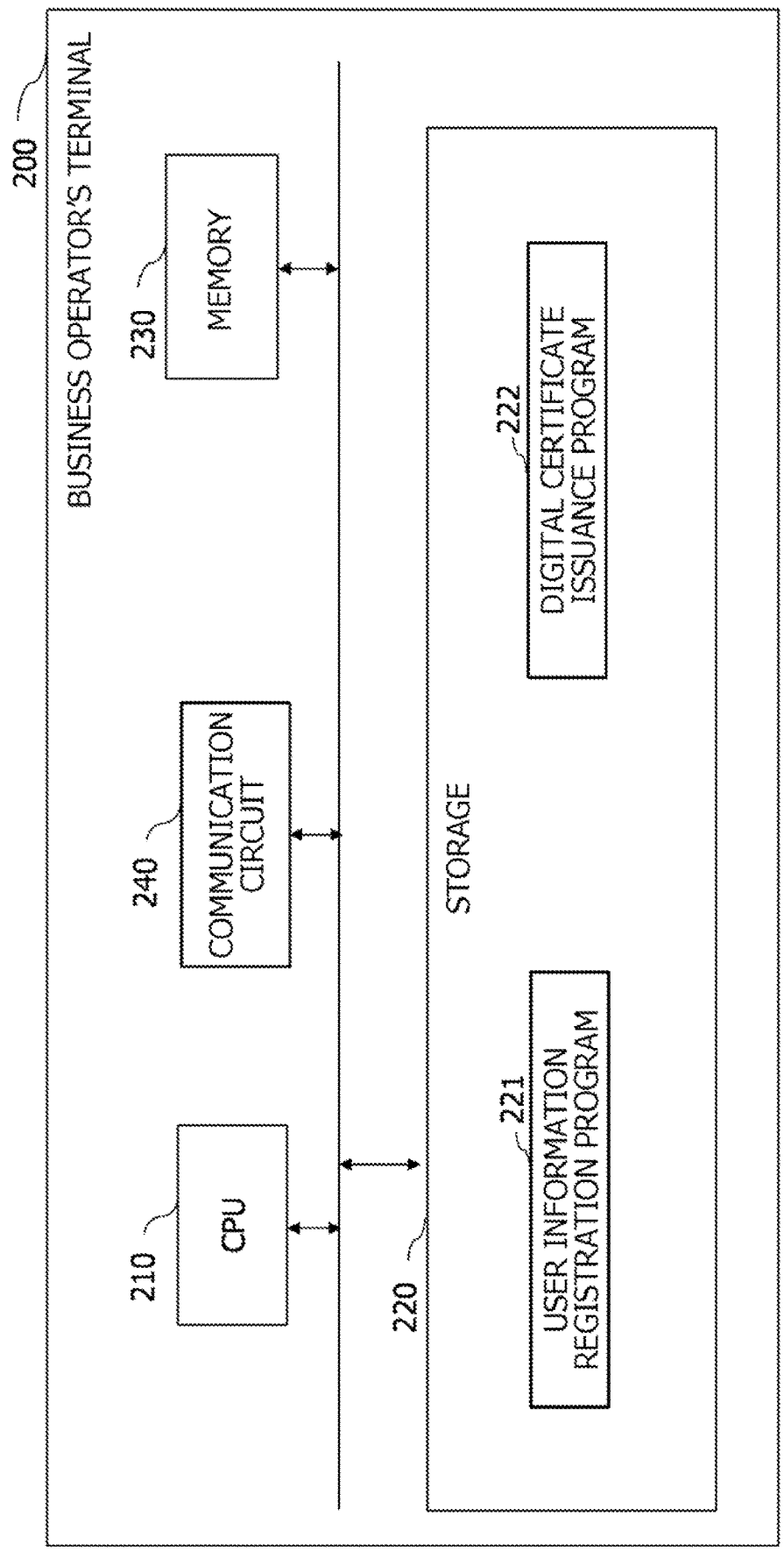
FIG. 2 is a diagram illustrating an exemplary configuration of a business operator's terminal 200.

FIG. 2 is a diagram illustrating an exemplary configuration of the business operator's terminal 200. The business operator's terminal 200 includes a central processing unit (CPU) 210, a storage 220, a memory 230, and a communication circuit 240.

The storage 220 is an auxiliary storage device that stores programs and data, such as a flash memory, a hard disk drive (HDD), or a solid state drive (SSD). The storage 220 stores a user information registration program 221 and a digital certificate issuance program 222.

The memory 230 is an area in which the program stored in the storage 220 is loaded. Furthermore, the memory 230 may be used as an area in which the program stores data.

The CPU 210 is a processor that builds each unit and implements each process by loading the program stored in the storage 220 into the memory 230 and executing the loaded program.

The communication circuit 240 is a circuit that communicates with other devices. The communication circuit 240 transmits and receives data to and from the other devices via a network. The communication circuit 240 is, for example, a network interface card (NIC).

The CPU 210 constructs a conversion unit and a confirmation request unit by executing the user information registration program 221 and executes user information registration processing. The user information registration processing includes registration processing for acquiring the user information from the user terminal 100 and registering (storing) the user information, and confirmation request processing for requesting the user terminal 100 to confirm registration content. The registration processing is processing that includes conversion processing for acquiring the user information and converting the user information into a management format, and management processing for storing the user information after conversion (converted user information) in an internal memory or the like and managing the user information. The confirmation request processing is processing for transmitting, to the user terminal 100, a registration content confirmation request including a hash value obtained by hashing the converted user information using a hash function, the hash function, and conversion content including the content converted in the conversion processing.

The CPU 210 constructs a certificate issuance unit by executing the digital certificate issuance program 222 and executes digital certificate issuance processing. The digital certificate issuance processing is processing for presenting (disclosing) the managed user information to the other business operator or the user as a digital certificate. The digital certificate issuance processing includes, for example, processing for acquiring permission to disclose the user information from the user 10. Furthermore, the digital certificate issuance processing is triggered, for example, by a request from the user 10 or a request from the other business operator. Moreover, the business operator's terminal 200 may execute the confirmation request processing before the user information is disclosed in the digital certificate issuance processing.

<Exemplary Configuration of User Terminal 100>

Figure 3:
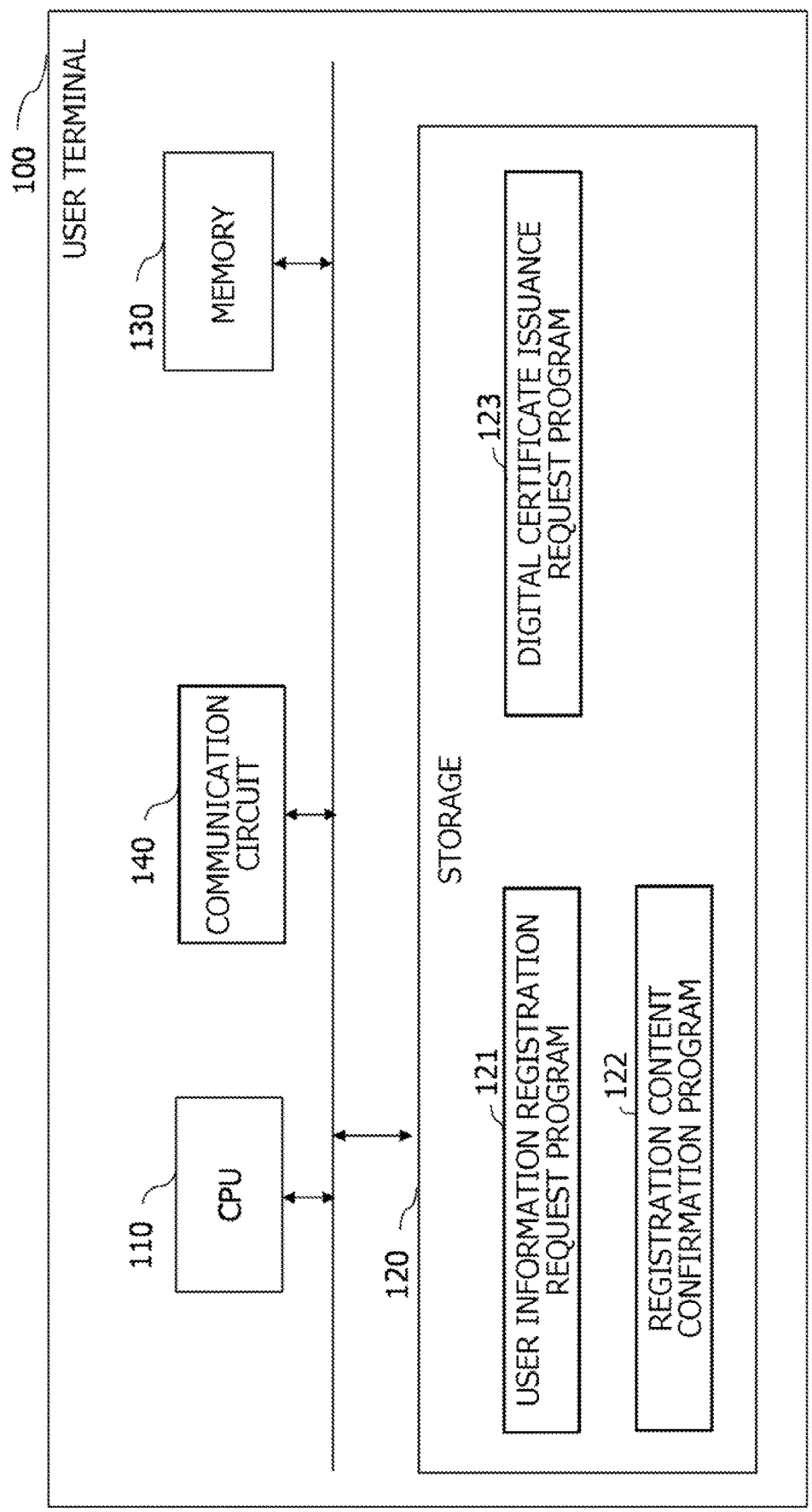
FIG. 3 is a diagram illustrating an exemplary configuration of a user terminal 100.

FIG. 3 is a diagram illustrating an exemplary configuration of the user terminal 100. The user terminal 100 includes a CPU 110, a storage 120, a memory 130, and a communication circuit 140.

The storage 120 is an auxiliary storage device that stores programs and data, such as a flash memory, an HDD, or an SSD. The storage 120 stores a user information registration request program 121, a registration content confirmation program 122, a digital certificate issuance request program 123.

The memory 130 is an area in which the program stored in the storage 120 is loaded. Furthermore, the memory 130 may be used as an area in which the program stores data.

The CPU 110 is a processor that builds each unit and implements each process by loading the program stored in the storage 120 into the memory 130 and executing the loaded program.

The communication circuit 140 is a circuit that communicates with other devices. The communication circuit 140 transmits and receives data to and from other devices via a network. The communication circuit 140 is, for example, an NIC or a wireless communication circuit.

The CPU 110 constructs a registration unit by executing the user information registration request program 121 and executes user information registration request processing. The user information registration request processing is processing for requesting the business operator's terminal 200 to register the user information.

The CPU 110 constructs a confirmation unit by executing the registration content confirmation program 122 and executes registration content confirmation processing. The registration content confirmation processing is processing that is executed in response to the registration content confirmation request received from the business operator's terminal 200. In the registration content confirmation processing, the user terminal 100 converts the registered user information into the management format according to conversion content, calculates a hash value obtained by hashing the converted user information using a hash function, and compares the received hash value and the calculated hash value. When the compared hash values coincide with each other, the user terminal 100 determines that the user information managed by the business operator's terminal 200 is correct. The registration content confirmation processing is processing for confirming validity of the managed user information (whether or not correctly managed) in response to the request of the business operator's terminal 200.

The CPU 110 constructs an issuance request unit by executing the digital certificate issuance request program 123 and executes digital certificate issuance request processing. The digital certificate issuance request processing is processing for requesting the business operator's terminal 200 to present (disclose) the user information to the other business operator and the user as a digital certificate. For example, the user 10 executes the digital certificate issuance request processing using the user terminal 100 when the user 10 needs to verify personal identification of himself/herself.

<User Information Registration Confirmation Processing>

The user 10 registers the user information to the business operator 20. Then, the business operator 20 confirms the user 10 whether or not the user registration is correct. This confirmation is processing that is executed not to distribute wrong user information because there is, for example, a case where the wrong user information is registered, a case where the registered user information is old (for example, attribute of user 10 is changed), or the like.

The processing for confirming the user information is executed, for example, when a digital certificate issuance request is issued by the user 10, when the user 10 registers the user information without via the ID distribution platform 300, when the business operator 20 tries to issue the user information of the user 10 as a certificate, or the like. In the following, when the user 10 registers the user information without via the ID distribution platform 300 will be described as an example.

Figure 4:
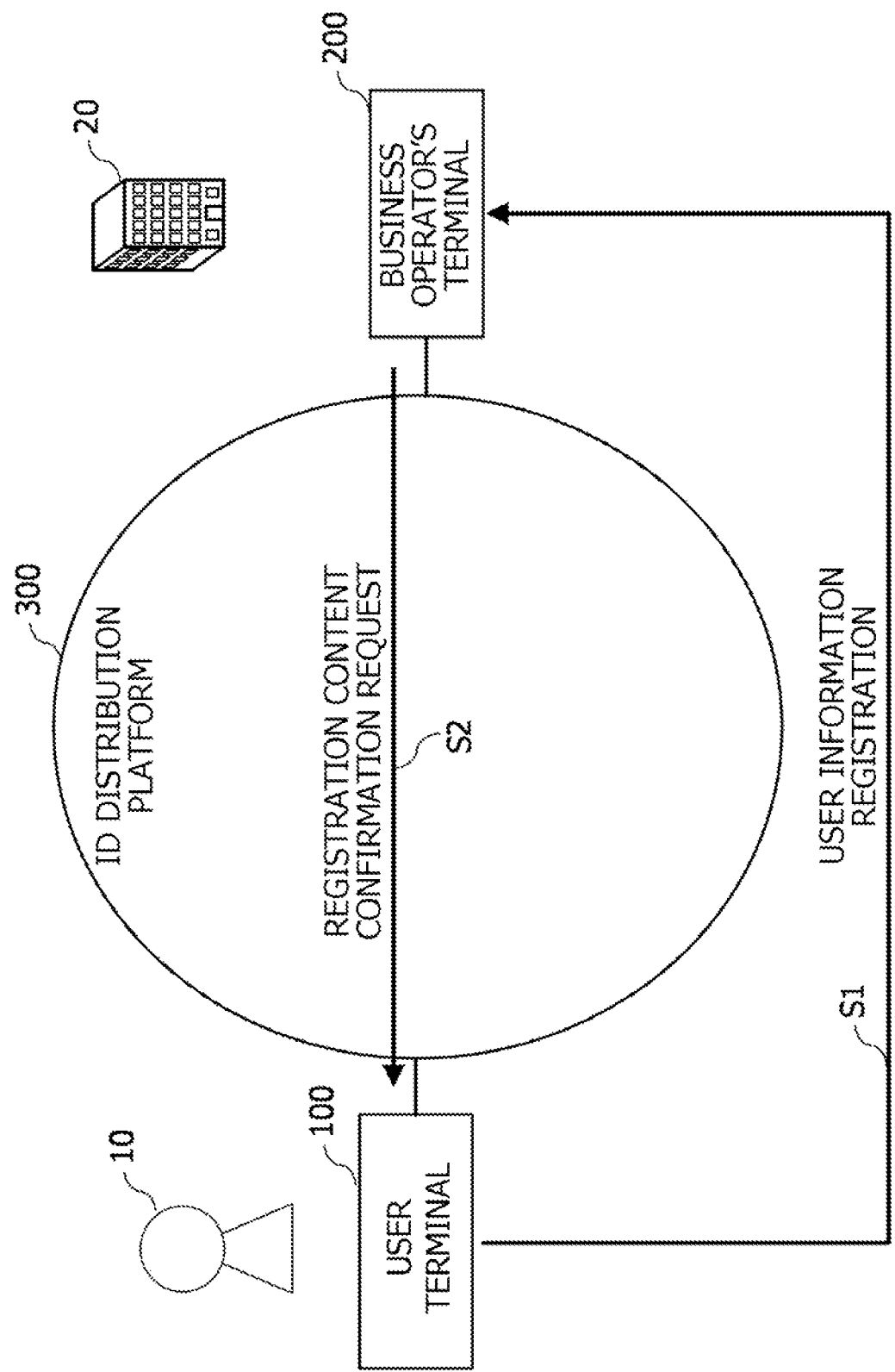
FIG. 4 is a diagram illustrating an example of a sequence of user information registration confirmation processing.

FIG. 4 is a diagram illustrating an example of a sequence of user information registration confirmation processing. The user 10 uses the user terminal 100 (hereinafter, user terminal 100 may be expressed as subject) and transmits user information registration for registering the user information of the user 10 to the business operator 20 (hereinafter, business operator's terminal 200 may be expressed as subject) (S1). The user terminal 100 communicates with the business operator's terminal 200 without via the ID distribution platform 300 and transmits the user information registration including the user information of the user 10.

Upon receiving the user information registration, the business operator's terminal 200 executes user information registration processing S100. The user information registration processing S100 is processing for converting the user information included in the user information registration into a management format for management by the business operator's terminal 200 and storing (managing) the user information.

Figure 5:
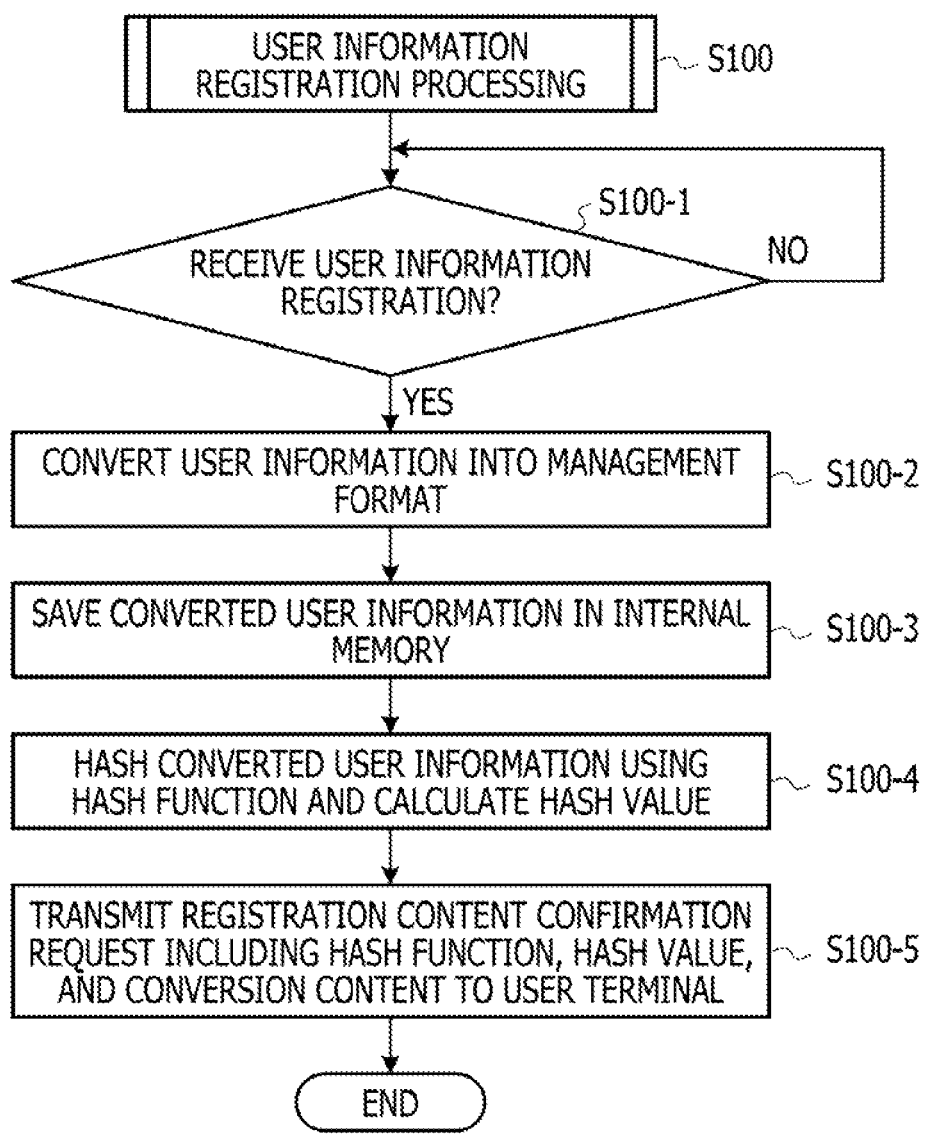
FIG. 5 is a diagram illustrating an example of a processing flowchart of user information registration processing S100.

FIG. 5 is a diagram illustrating an example of a processing flowchart of the user information registration processing S100. The business operator's terminal 200 waits for receipt of the user information registration (No in S100-1), Upon receiving the user information registration (Yes in S100-1), the business operator's terminal 200 converts the user information into the management format (S100-2).

The business operator's terminal 200 saves (stores) the converted user information in an internal memory (S100-3). The user information is stored in association with, for example, an identifier of the user 10.

The business operator's terminal 200 hashes the converted user information using a hash function and calculates a hash value (S100-4). The hash value is calculated in order to be distributed on the ID distribution platform 300 with high security.

The business operator's terminal 200 transmits a registration content confirmation request including the hash function, the hash value, and conversion content to the user terminal 100 (S100-5) and terminates the processing. The conversion content indicates content of the conversion performed in the processing S100-2. Furthermore, the conversion content may include not only the content of the conversion performed in the processing S100-2 but also content of conversion (all conversions into management format) that is not executed on the user information and may be executed on another piece of user information.

Returning to the sequence in FIG. 4, the business operator's terminal 200 converts the user information into the management format (S100-2 in FIG. 5), calculates the hash value of the converted user information (S100-4 in FIG. 5), and transmits the registration content confirmation request including the hash function, the hash value, and the conversion content to the user terminal 100 via the ID distribution platform 300 (S2, S100-5 in FIG. 5).

Upon receiving the registration content confirmation request, the user terminal 100 executes registration content confirmation processing S200. The registration content confirmation processing S200 is processing for confirming whether or not the registered user information is correct, using the hash value.

Figure 6:
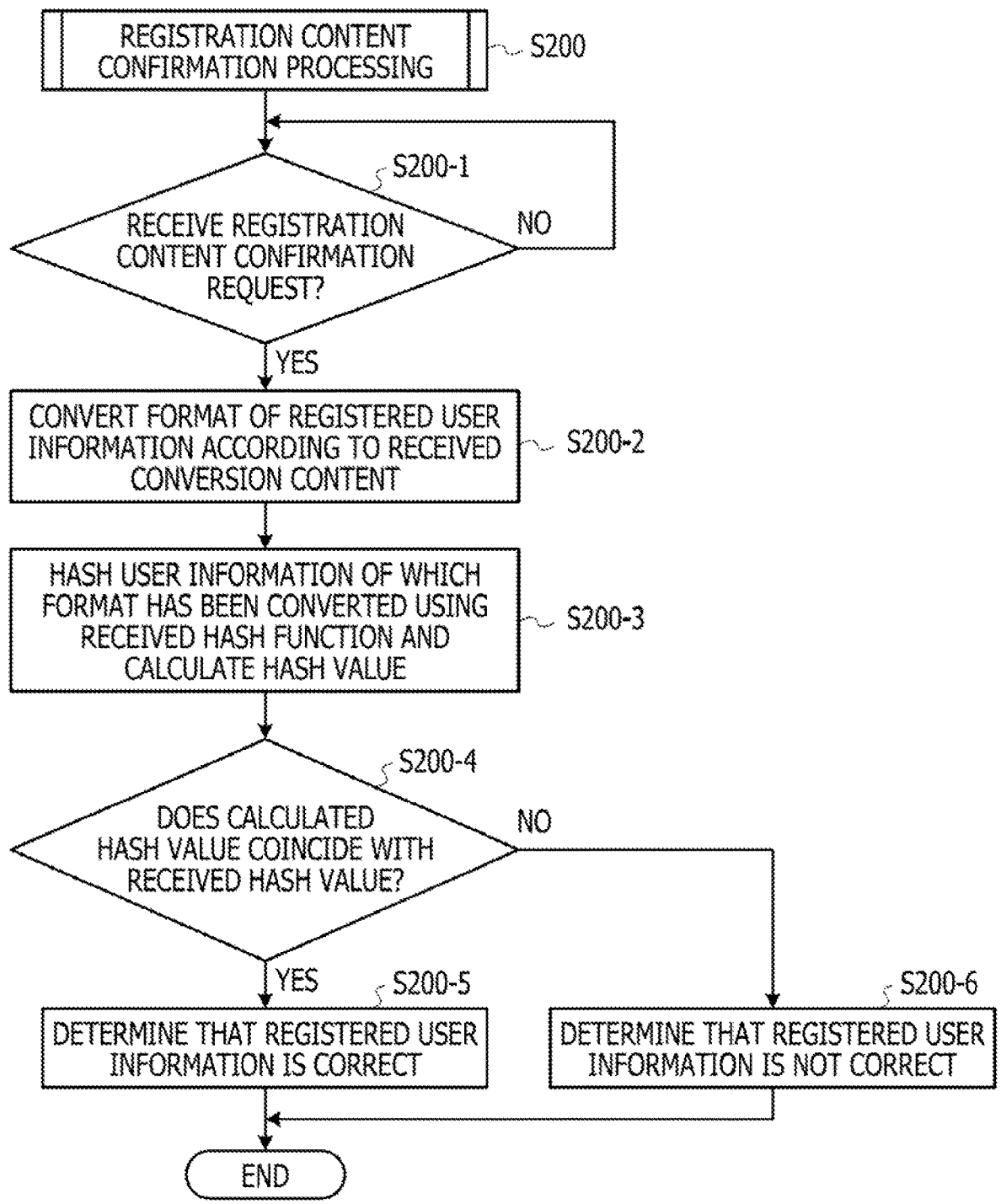
FIG. 6 is a diagram illustrating an example of a processing flowchart of registration content confirmation processing S200.

FIG. 6 is a diagram illustrating an example of a processing flowchart of the registration content confirmation processing S200. The user terminal 100 waits for receive a registration content confirmation request (No in S200-1). Upon receiving the registration content confirmation request (Yes in S200-1), the user terminal 100 converts a format of the registered user information (user information transmitted to the business operator's terminal 200) according to the received conversion content (S200-2).

Then, the user terminal 100 hashes the user information of which the format has been converted using the received hash function and calculates a hash value (S200-3).

The user terminal 100 compares the calculated hash value and the received hash value (S200-4). When the hash values coincide with each other, the user terminal 100 determines that the user information registered (being registered) is correct (S200-5) and terminates the processing. On the other hand, when the hash values do not coincide with each other, the user terminal 100 determines that the user information registered (being registered) is not correct (S200-6) and terminates the processing.

Returning to the sequence in FIG. 4, in the registration content confirmation processing S200, the user terminal 100 converts the format of the user information according the conversion content (S200-2 in FIG. 6), calculates the hash value of the converted user information (S200-3 in FIG. 6), compares the calculated hash value with the received hash value (S200-4 in FIG. 6), and determines whether or not the registered user information is correct.

Figure 7:
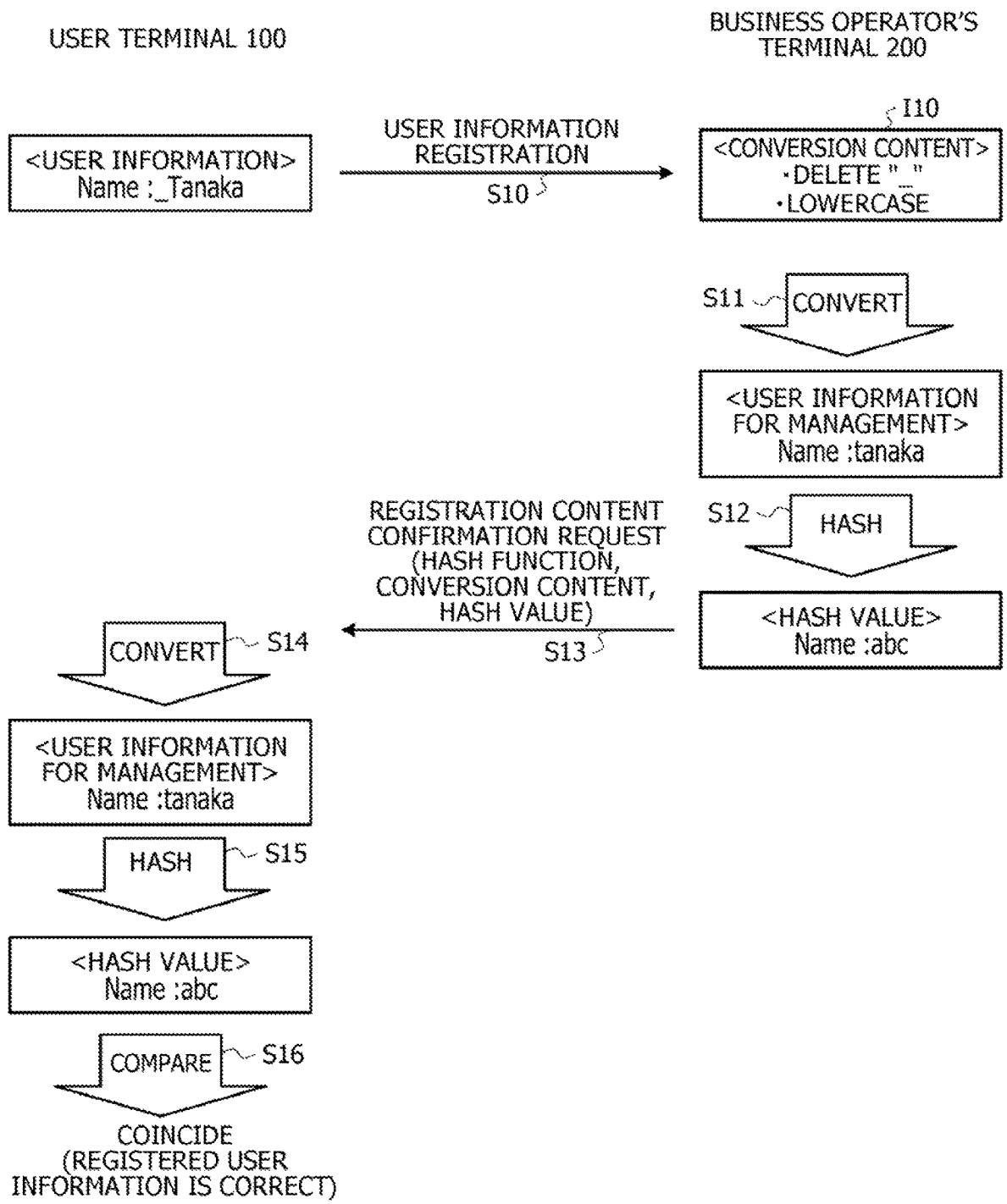
FIG. 7 is a diagram illustrating an example of the user information registration confirmation processing.

User information registration confirmation processing will be described using an example of the user information and the conversion content. FIG. 7 is a diagram illustrating an example of the user information registration confirmation processing. The user terminal 100 makes user information "Name:_Tanaka" be included in user information registration and transmits the user information registration to the business operator's terminal 200 (S10). The user information "Name:_Tanaka" is information indicating that data with an attribute "Name" is "_Tanaka". The attribute is a type of data and, for example, "Name" indicates a name of the user.

Upon receiving the user information registration, the business operator's terminal 200 executes the user information registration processing S100. In the user information registration processing S100, the business operator's terminal 200 converts the received user information into a management format according to conversion content I10 (S100-2 in FIG. 5, S11). In the processing S100-2, the business operator's terminal 200 deletes "_" from "_Tanaka" according to "delete "_"" in the conversion content I10 and performs conversion into "Tanaka". Moreover, the business operator's terminal 200 changes "T" in "Tanaka" to a lowercase "t" according to "lowercase" in the conversion content I10 and performs conversion into "tanaka". The business operator's terminal 200 performs this conversion (S11) and obtains user information in the management format (user information for management) "Name: tanaka".

As illustrated in FIG. 7, in a case where there is a plurality of pieces of conversion content, a list of the conversion content is described as the conversion content I10. Furthermore, the conversion content I10 may be indicated using a logical expression or another language in addition to Japanese as in FIG. 7.

In the user information registration processing S100, the business operator's terminal 200 hashes the converted user information "Name: tanaka" using a hash function and calculates a hash value (S100-4 in FIG. 5, S12). The business operator's terminal 200 calculates a hash value "abc" obtained by hashing the data "tanaka" of the converted user information "Name: tanaka" using a hash function f1.

In the user information registration processing S100, the business operator's terminal 200 transmits a registration content confirmation request including the hash function f1, the hash value "abc", and the conversion content I10 to the user terminal 100 (S13, S100-S in FIG. 5).

Upon receiving the registration content confirmation request, the user terminal 100 executes the registration content confirmation processing S200. In the registration content confirmation processing S200, the user terminal 100 converts a format of the registered user information according to the received conversion content (S200-2 in FIG. 6, S14). In the processing S200-2, the user terminal 100 deletes "_" from the data "_Tanaka" of the registered user information "Name:_Tanaka" according to "delete "_"" in the conversion content I10 and performs conversion into "Tanaka". Moreover, the user terminal 100 changes "T" in "Tanaka" to a lowercase "t" according to "lowercase" in the conversion content I10 and performs conversion into "tanaka". The user terminal 100 performs this conversion (S14) and obtains user inform at for management "Name: tanaka".

In the registration content confirmation processing S200, the user terminal 100 hashes the converted user information "Name: tanaka" using the hash function and calculates a hash value (S200-3 in FIG. 6, S15). The user terminal 100 calculates a hash value "abc" obtained by hashing the data "tanaka" of the converted user information "Name: tanaka" using the received hash function f1.

The user terminal 100 compares the calculated hash value and the received hash value (S200-4 in FIG. 6, S16). The user terminal 100 determines that the calculated hash value "abc" is the same as the received hash value "abc" (Yes in S200-4 in FIG. 6) and determines that the registered user information is correct (S200-5 in FIG. 6).

In the first embodiment, the user terminal 100 can perform the format conversion same as that of the business operator's terminal 200 by receiving the conversion content and can calculate a hash value in a format unique to the business operator. As a result, even in a case where the business operator manages the user information in its unique format, the user can determine whether or not the user information of the user himself/herself is correctly managed.

Second Embodiment

Next, a second embodiment will be described. In the second embodiment, a business operator's terminal 200 further adds noise to converted user information at the time in calculation of a hash value. By adding the noise, noise information, in addition to conversion content (how to add noise, noise addition method) is needed in calculation of the hash value, and security is enhanced.

<User Information Registration Confirmation Processing>

A basic sequence is similar to the sequence in FIG. 4. The user terminal 100 transmits user information registration for registering user information of a user 10 in the business operator's terminal 200 (S1). Upon receiving the user information registration, the business operator's terminal 200 executes user information registration processing S101.

Figure 8:
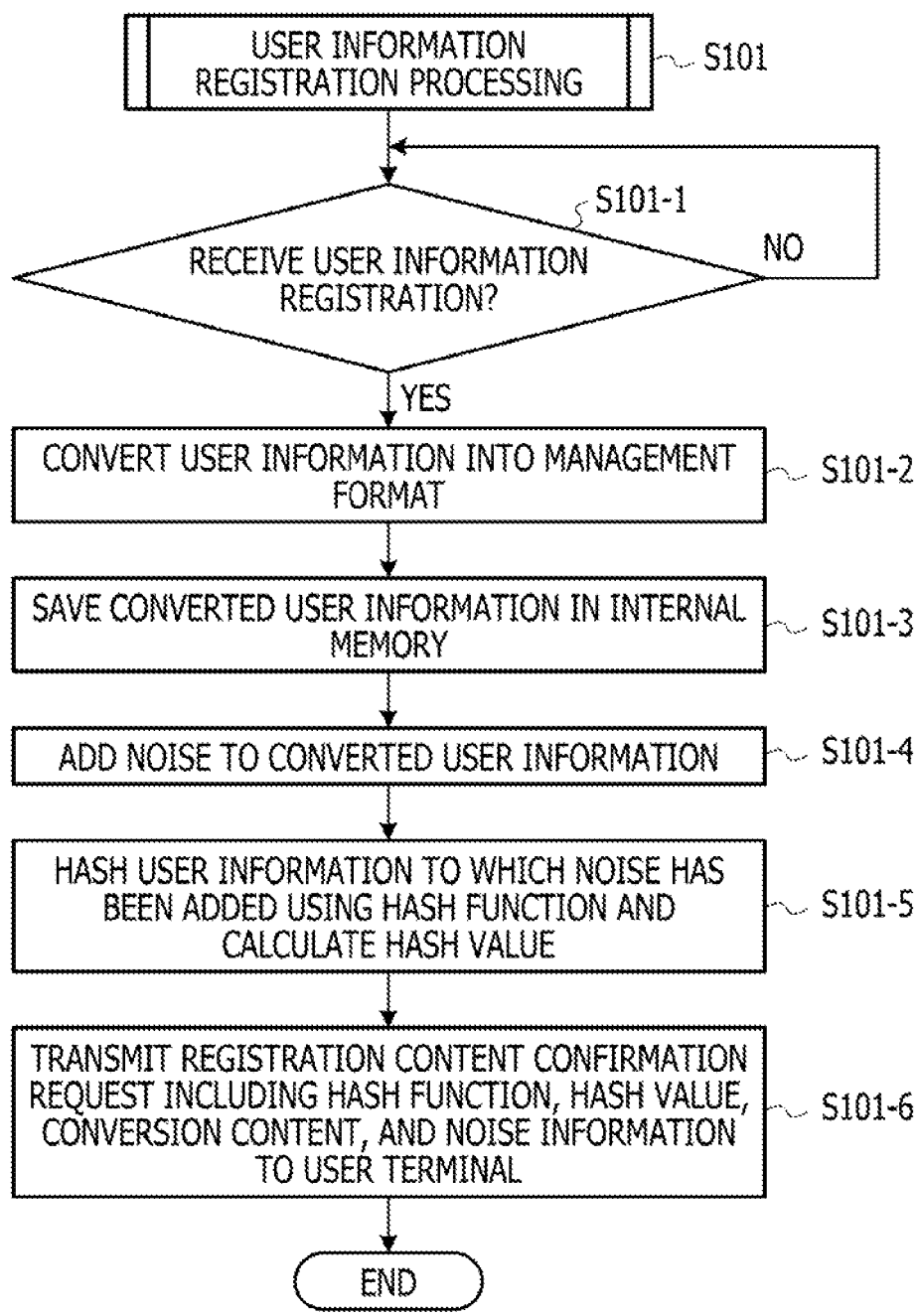
FIG. 8 is a diagram illustrating an example of a processing flowchart of user information registration processing S101.

FIG. 8 is a diagram illustrating an example of a processing flowchart of the user information registration processing S101. The business operator's terminal 200 waits for receipt of the user information registration (No in S101-1). Upon receiving the user information registration (Yes in S101-1), the business operator's terminal 200 converts the user information into the management format (S101-2).

The business operator's terminal 200 saves (stores) the converted user information in an internal memory (S101-3).

The business operator's terminal 200 adds noise to the converted user information (S101-4). The addition of the noise is, for example, to add a predetermined character string to a predetermined position in data of the user information.

The business operator's terminal 200 hashes the user information to which the noise is added (user information with noise) using a hash function and calculates a hash value (S101-5).

The business operator's terminal 200 transmits a registration content confirmation request including the hash function, the hash value, the conversion content, and the noise information to the user terminal 100 (S101-6) and terminates the processing. The noise information indicates content of the noise that has been added in the processing S101-4.

Returning to the sequence in FIG. 4, the business operator's terminal 200 converts the user information into the management format (S101-2 in FIG. 8), adds noise to the converted user information (S101-4 in FIG. 8), calculates the hash value of the user information to which the noise has been added (S101-5 in FIG. 8), and transmits the registration content confirmation request including the hash function, the hash value, the conversion content, and the noise information to the user terminal 100 via the ID distribution platform 300 (S2, S101-6 in FIG. 8).

Upon receiving the registration content confirmation request, the user terminal 100 executes registration content confirmation processing S201.

Figure 9:
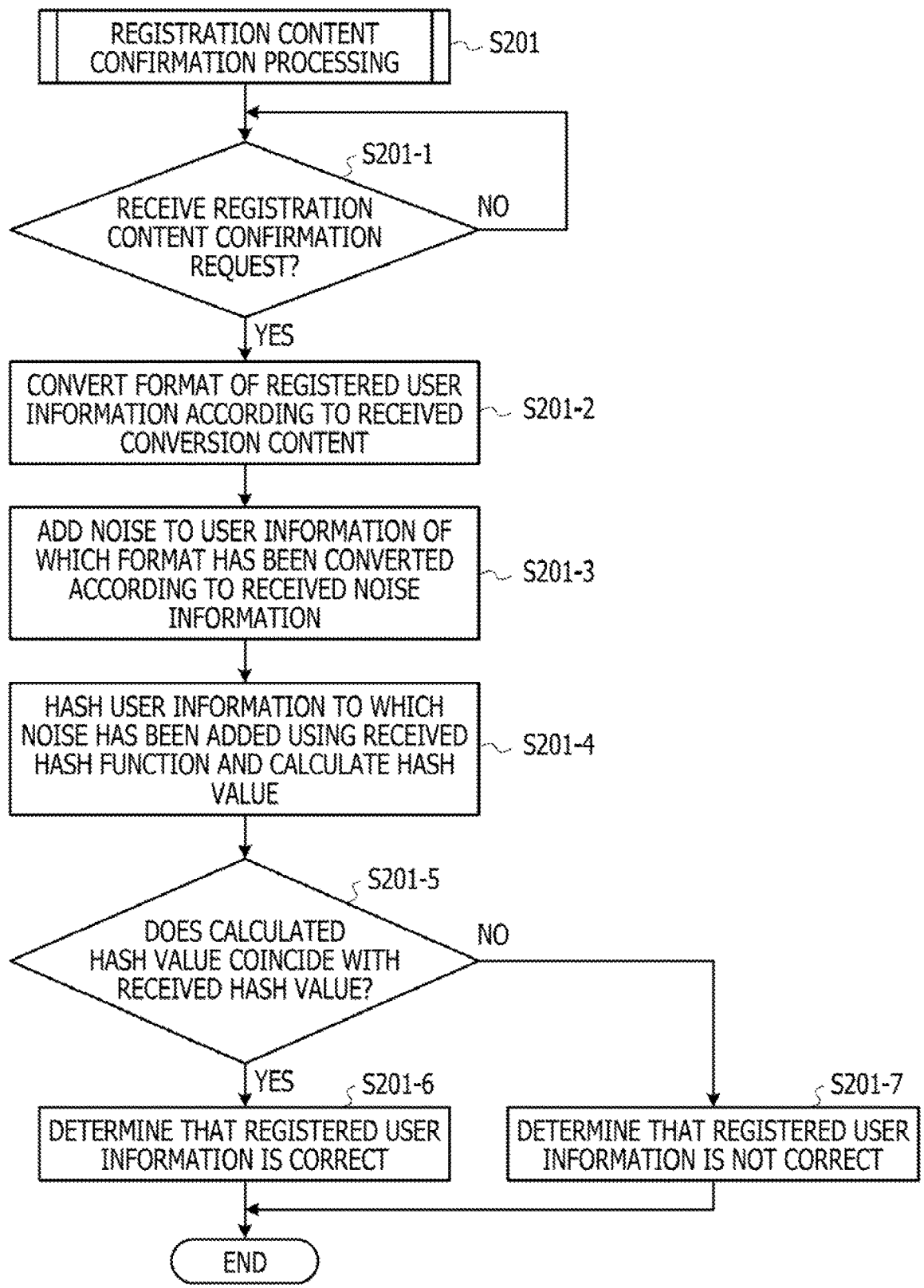
FIG. 9 is a diagram illustrating an example of a processing flowchart of registration content confirmation processing S201.

FIG. 9 is a diagram illustrating an example of a processing flowchart of the registration content confirmation processing S201. The user terminal 100 waits for receive a registration content confirmation request (No in S201-1). Upon receiving the registration content confirmation request (Yes in S201-1), the user terminal 100 converts a format of the registered user information according to the received conversion content (S201-2).

Then, the user terminal 100 adds noise to the converted user information according to the received noise information (S201-3).

Then, the user terminal 100 hashes the user information to which the noise has been added using the received hash function and calculates a hash value (S201-4).

The user terminal 100 compares the calculated hash value and the received hash value (S201-5). When the hash values coincide with each other, the user terminal 100 determines that the registered user information is correct (S201-6) and terminates the processing. On the other hand. When the hash values do not coincide with each other, the user terminal 100 determines that the registered user information is not correct (S201-7) and terminates the processing.

Returning to the sequence in FIG. 4, in the registration content confirmation processing S201, the user terminal 100 converts the format of the user information according to the conversion content (S201-2 in FIG. 9), adds the noise to the converted user information according to the noise information (S201-3 in FIG. 9), calculates the hash value of the user information to which the noise has been added (S201-4 in FIG. 9), compares the calculated hash value with the received hash value (S201-5 in FIG. 9), and determines whether or not the registered user information is correct.

User information registration confirmation processing will be described using an example of noise information.

FIG. 10 is a diagram illustrating an example of the user information registration confirmation processing according to the second embodiment. The user terminal 100 makes user information "Name:_Tanaka" be included in user information registration and transmits the user information registration to the business operator's terminal 200 (S20).

Upon receiving the user information registration, the business operator's terminal 200 executes the user information registration processing S101. In the user information registration processing S101, the business operator's terminal 200 converts the received user information into a management format according to conversion content I10 (S101-2 in FIG. 8, S21). In the processing S101-2, the business operator's terminal 200 deletes "_" from "_Tanaka" according to "delete "_"" in the conversion content I10 and performs conversion into "Tanaka". Moreover, the business operator's terminal 200 changes "T" in "Tanaka" to a lowercase "t" according to "lowercase" in the conversion content I10 and performs conversion into "tanaka". The business operator's terminal 200 performs this conversion (S21) and obtains user information for management "Name: tanaka".

In the user information registration processing S101, the business operator's terminal 200 adds noise to the user information for management according noise information I11 (S101-4 in FIG. 8). The business operator's terminal 200 obtains "Name: txyzanaka" obtained by adding "xyz" after the second character of the user information for management "Name: tanaka" according to "add "xyz" after the first character" in the noise information I11.

In the user information registration processing S101, the business operator's terminal 200 hashes the user information to which the noise has been added using the hash function and calculates a hash value (S101-5 in FIG. 8, S23) The business operator's terminal 200 calculates, using a hash function f1, a hash value "def" obtained by hashing data "txyzanaka" of the user information "Name: txywzanaka" to which the noise has been added.

In the user information registration processing S101, the business operator's terminal 200 transmits a registration content confirmation request including the hash function f1, the hash value "def", the conversion content I10, and the noise information I11 to the user terminal 100 (S24, S101-6 in FIG. 8).

Upon receiving the registration content confirmation request, the user terminal 100 executes the registration content confirmation processing S201. In the registration content confirmation processing S201, the user terminal 100 converts a format of the registered user information according to the received conversion content (S201-2 in FIG. 9, S25). In the processing S201-2, the user terminal 100 deletes "_" from the data "_Tanaka" of the registered user information "Name:_Tanaka" according to "delete "_"" in the conversion content I10 and performs conversion into "Tanaka". Moreover, the user terminal 100 changes "T" in "Tanaka" to a lowercase "t" according to "lowercase" in the conversion content I10 and performs conversion into "tanaka". The user terminal 100 performs this conversion (S25) and obtains user information for management "Name: tanaka".

In the registration content confirmation processing S201, the user terminal 100 adds noise to the user information for management according to the received noise information I11 (S201-3 in FIG. 9, S26). The user terminal 100 obtains "Name: txyzanaka" obtained by adding "xyz" after the second character of the user information for management "Name: tanaka" according to "add "xyz" after the first character" in the noise information I11.

In the registration content confirmation processing S201, the user terminal 100 hashes the user information to which the noise has been added using the hash function and calculates a hash value (S201-4 in FIG. 9, S27). The user terminal 100 calculates, using the received hash function f1, a hash value "def" obtained by hashing data "txyzanaka" of the user information "Name: txyzanaka" to which the noise has been added.

The user terminal 100 compares the calculated hash value and the received hash value (S201-5 in FIG. 9, S28). The user terminal 100 determines that the calculated hash value "def" is the same as the received hash value "def" (Yes in S201-5 in FIG. 9) and determines that the registered user information is correct (S201-6 in FIG. 9).

In the second embodiment, by using the user information to which the noise has been added to calculate the hash value, the security is enhanced.

Other Embodiments

Other embodiments will be described. User information may be described in Japanese. For example, a user terminal 100 transmits user information registration including user information "Name: tanaka (in Katakana)" and a business operator's terminal 200 converts Katakana into Hiragana as in conversion content and saves (manages) user information for management "Name: tanaka (in Hiragana)". Even in this case, the user terminal 100 can confirm validity of the user information by receiving the conversion content from the business operator's terminal 200. Furthermore, regarding noise addition, processing similar to the second embodiment can be executed.

Furthermore, conversion other than conversion content described above may be performed. FIG. 11 is a diagram illustrating an example of format conversion. "(1) Deletion of blanks at the beginning and end" is conversion to delete blanks in a case where the blanks (space) exist at the beginning and the end. "(2) Deletion of consecutive blanks" is conversion to delete consecutive blanks in a case where the consecutive blanks exist. "(3) Conversion of uppercase/lowercase" is conversion to change an uppercase to a lowercase or a lowercase to an uppercase. "(4) Conversion of full-width/half-width" is conversion to change full-width to half-width or half-width to full-width. "(5) Conversion of Hiragana/Katakana" is conversion to change Hiragana to Katakana or Katakana to Hiragana. "(6) Conversion into date format (yyyy/mm/dd)" is conversion to change data into a yyyy/mm/dd format. The expression yyyy indicates the Christian Era year, the expression mm indicates a month (for example, January is expressed as 01), and the expression dd indicates a date (for example, the first day is expressed as 01). "(7) Conversion into phone number format (000-000-0000)" is conversion to change data into a 000-000-0000 (0 is any numerical number) format. The number of any numerical numbers in the phone number format may be different for a mobile phone or a landline.

The lower table in FIG. 11 is a diagram illustrating an example of an attribute and conversion. An attribute "Name" indicates a name, and conversions (1), (2), and (3) are performed. For example, "Tanaka" is converted into "tanaka". An attribute "Birthday" indicates a birthday. An attribute "Address" indicates an address. An attribute "Telephone" indicates a telephone number. An attribute "Occupation" indicates an occupation. An attribute "Email" indicates an email address. In data of each attribute, as illustrated in the conversion examples, the conversion described in the conversion content is performed. Note that the business operator's terminal 200 may transmit an information content confirmation request including the conversion example as illustrated in FIG. 11 in addition to the conversion content.

Furthermore, noise may be added by a method other than the noise addition described above. FIG. 12 is a diagram illustrating an example of noise information. "Tokenization" is a method for adding a character string (value) to a specific position and is a method indicated in the embodiments described above.

"Masking" is a method for replacing a specific position with a specific character. For example, in a case where the first and second characters are replaced with "*", "tanaka" is converted into "**naka".

"Exchange" is a method for exchanging characters at specific positions. For example, in a case where the first and second characters are exchanged to each other, "tanaka" is converted into "atnaka". Note that the business operator's terminal 200 may transmit the information content confirmation request including an application example as illustrated in FIG. 12 in addition to the noise information.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a processor included in a business operator's terminal to execute a process, the process comprising:
    conversion processing that converts user information acquired from a user into a management format, to obtain the converted user information; and
    confirmation request processing that calculates a first hash value obtained by hashing the converted user information with a first hash function, transmits a confirmation request including the first hash value, the first hash function, and conversion content of the conversion to the user, and requests the user to confirm validity of the user information managed, the confirmation request processing further includes:
    adding a noise to the converted user information to obtain noise added user information; and
    obtaining a second hash value by hashing the noise added user information with the first hash function, and
    the confirmation request includes the second hash value, the first hash function, the conversion content, and noise information related to the noise.

2. The non-transitory computer-readable storage medium according to claim 1, wherein
    the business operator's terminal and the user communicate with each other via a first network or a second network that has higher security than the first network, and
    the confirmation request processing includes transmitting the confirmation request via the second network.

3. The non-transitory computer-readable storage medium according to claim 2, the process further comprising:
  management processing that acquires the user information from the user via the first network and stores the converted user information.

4. The non transitory compute readable storage medium according to claim 1, wherein
  the conversion into the management format includes deletion of a character included in the user information, and
  the conversion content includes information regarding a type of the deleted character or information regarding a position of the deleted character in the user information.

5. The non-transitory computer-readable storage medium according to claim 1, wherein
  the conversion into the management format includes replacement of characters included in the user information, and
  the conversion content includes information regarding a type of the characters before and after being replaced in the replacement or information regarding a position of the replaced character in the user information.

6. The non-transitory computer-readable storage medium according to claim 1, wherein
  the noise information includes information regarding a type of the noise and information regarding a position in the converted user information to which the noise has been added.

7. The non-transitory computer-readable storage medium according to claim 1, wherein
  the adding includes exchanging of characters included in the converted user information, and
  the noise information includes information regarding a type of the exchanged characters or information regarding positions of the exchanged characters in the converted user information.

8. The non-transitory computer-readable storage medium according to claim 1, wherein
  the adding includes replacement of characters included in the converted user information, and
  the noise information includes information regarding a type of the characters before and after being replaced in the replacement or information regarding a position of the replaced character in the converted user information.

9. A communication device that manages user information of a user, the communication device comprising:
  a non-transitory computer-readable memory; and
  a hardware processor coupled to memory and configured to:
  convert user information acquired from the user into a management format and obtain converted user information,
  calculate a first hash value obtained by hashing the converted user information with a first hash function,
  transmit a confirmation request that includes the first hash value, the first hash function, and conversion content of the conversion to the user,
  request the user to confirm validity of the user information managed,
  add a noise to the converted user information to obtain noise added user information;
  obtain a second hash value by hashing the noise added user information with the first hash function, and
  the confirmation request includes the second hash value, the first hash function, the conversion content, and noise information related to the noise.

10. A non-transitory computer-readable storage medium storing a program that causes a processor included in a user terminal to execute a process, the process comprising:
  registration processing that converts user information of the user into a management format and transmits converted user information to a business operator's terminal that manages the user information;
  reception processing that receives a confirmation request including a first hash value obtained by hashing the converted user information calculated by the business operator's terminal with a first hash function, the first hash function, and conversion content of the conversion from the business operator's terminal; and
  confirmation processing that responds to receipt of the confirmation request, converts the transmitted user information according to the conversion content, adds a noise to the converted user information to obtain noise added user information, calculates a second hash value obtained by hashing the noise added user information with the first hash function, compares the first hash value with the second hash value, and confirms validity of the user information managed by the business operator's terminal,
  the confirmation request includes the second hash value, the first hash function, the conversion content, and noise information related to the noise.

* * * * *